J. B. Dougherty.
Mach. for Making Hoops.
No. 3,443. Reissued May 18, 1869.
Fig; 1;
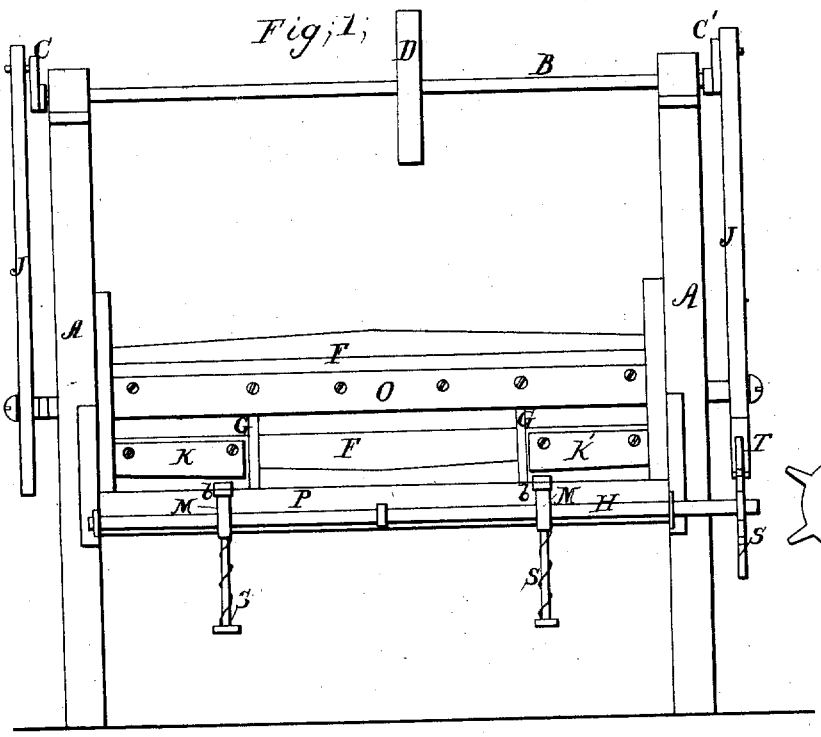
Fig; 2;
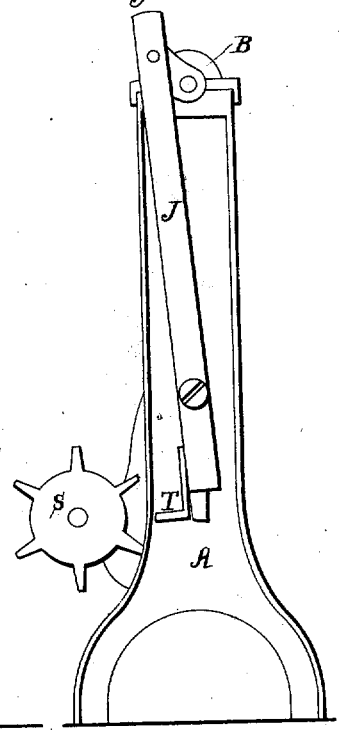
Fig; 6;
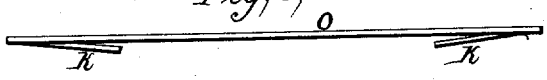
Fig; 3;
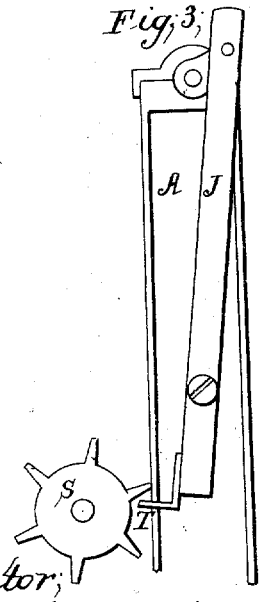
Fig; 4;
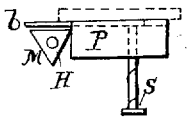
Fig; 5;
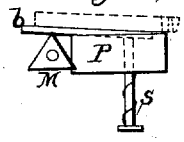
Fig; 7;
Witnesses;
J. A. Davis.
George Raines
Inventor;
Helen Dougherty.
Assignee By J. Fraser & Co.
Attys.
N. PETERS, PHOTO-LITHOGRAPHER, WASHINGTON, D. C.

UNITED STATES PATENT OFFICE.

HELEN DOUGHERTY, OF ROCHESTER, NEW YORK, ASSIGNEE, BY MESNE ASSIGNMENTS, OF J. B. DOUGHERTY.

IMPROVEMENT IN MACHINES FOR MAKING SPLINTS FOR BARREL-HOOPS.

Specification forming part of Letters Patent No. 41,688, dated February 23, 1864; Reissue No. 3,443, dated May 18, 1869.

*To all whom it may concern:*

Be it known that JOHN B. DOUGHERTY, of Rochester, in the county of Monroe and State of New York, did invent certain new and useful Improvements in Machines for Cutting Hoops, patented February 23, 1864, of which Letters Patent, I, HELEN DOUGHERTY, of Rochester, aforesaid, am sole assignee; and I do hereby declare that the following is a full and exact description thereof, reference being had to the accompanying drawings, making part of this specification.

Figure 1 is a front elevation of this improved machine; Fig. 2, an end elevation; Fig. 3, a similar view, but with the crank moving in the opposite direction; Figs. 4 and 5, views showing the tilting supports for the hoop-timber in different positions; Fig. 6, a diagram showing the position of the knives for cutting and tapering the hoop; Fig. 7, an edge view of the cut and tapered hoop complete.

Like letters of reference indicate corresponding parts in all the figures.

The object of this improvement is to cut the hoops from a plank or board in an alternately right-angled and beveled line with the side or face of the said plank or board, so as to produce the hoops with one edge thicker than the other, to fit the incline of the barrel to which they are applied, and at the same time economize the stuff by producing no waste.

The object is further to taper the ends of the hoops, as well as cut them from the timber, which effect is produced by the employment of auxiliary inclined knives used in connection with the main one, as hereinafter set forth.

As represented in the drawings, A is a frame of suitable form, having at the top a shaft, B, driven by pulley D. With the ends of B connect cranks C C′, which give a reciprocating motion to a knife-frame, F, in the main frame through the medium of connecting-rod J J, as shown.

To the knife-frame is secured a long, straight-edged knife, O, for cutting the hoops from the plank, and below this short auxiliary knives K K at the ends, set at a slight angle, Fig. 6, for the purpose of cutting the taper at the end of the hoop, which is shown in Fig. 7. Thus, as the knife-frame goes down, it cuts a tapered hoop at each stroke.

In order that the plank or board may be properly presented to the knives, the frame F carries two guides, G G, which, at the lower end, allow said plank or board to be advanced just so much as is desired to cut off the required taper, and at the upper end regulate the distance of the edge of the plank or board from the knife O as may be required for the thickness of the hoop desired.

The support for the plank or board to receive the action of the knives is as follows: Into the platform P of frame A are let two or more transverse bars, *b b*, on which the plank or board rests. These bars are fitted loosely to the platform, so as to be raised, but are held down by springs *s s*, secured on pendants from the bars, as shown, or otherwise attached. Under the outer ends of these bars rest cams M M, of triangular or equivalent form, so as to raise and lower the ends of the bars as the cams are revolved. These cams are secured to a shaft, H, which receives motion by some suitable means, that shown in the drawings being a star-wheel, S, at one end, with which engages a toe, T, of the connecting-rod J in the upstroke. The action of these parts is so relatively connected with that of the knife-frame that the shaft H receives a motion to alternately raise or lower the bars *b* at every upstroke of the said knife-frame, but remains still during the descent of the knife-frame.

The operation will be readily understood. The plank or board from which the hoops are to be cut is placed on the tilting bars *b b*, as indicated by the red lines, Figs. 4 and 5. It will be seen that as the plank is alternately presented to the knife in a horizontal and an angular position by the action of the bars *b* the hoops will be cut by the main knife O alternately in a right angled line and a bevel line with the side or face of the plank, thus leaving a thick edge on one side of the hoop and a thin edge the other side; and as the hoops are successively cut the thick and thin edges alternate in position. Thus the hoops are not only cut by the simple strokes of the knife, but they are cut in the beveled form necessary to fit the barrel, and they are cut in such a manner that there is no waste of the timber.

The employment of the angular knives K K insures the dressing down of the taper of the ends of the hoop necessary to lap and join around the barrel. This is also accomplished by the same stroke of the knife-frame—an effect, it is believed, never accomplished prior to this invention.

What I claim as the invention of the aforesaid JOHN B. DOUGHERTY is—

1. As an improvement in the manufacture of hoops, the cutting of the hoops from the edge of the plank or board by cuts alternately in a right-angled line and a bevel line with the side of face of the plank or board, or in alternate bevel lines, as set forth.

2. The combination of the knives K K with the knife O, for the purpose of cutting the taper of the ends of the hoop at the same time that the hoop is cut from the timber.

3. The combination of the tilting bars *b*, cams M, and springs *s*, as and for the purpose specified.

HELEN DOUGHERTY.

Witnesses:
R. F. OSGOOD,
JAS. LORENZO GAGE.